United States Patent
Wuebbeling

(10) Patent No.: US 9,005,326 B2
(45) Date of Patent: Apr. 14, 2015

(54) CYCLONE SEPARATOR

(71) Applicant: Mann+Hummel GmbH, Ludwigsburg (DE)

(72) Inventor: Martin Wuebbeling, Mannheim (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 14/053,985

(22) Filed: Oct. 15, 2013

(65) Prior Publication Data

US 2014/0102054 A1    Apr. 17, 2014

(30) Foreign Application Priority Data

Oct. 15, 2012  (DE) .......................... 10 2012 020 133
Oct. 18, 2012  (DE) .......................... 10 2012 020 380

(51) Int. Cl.
*B01D 45/12*     (2006.01)
*B04C 3/04*      (2006.01)
*B04C 3/06*      (2006.01)
*F02M 35/022*    (2006.01)

(52) U.S. Cl.
CPC ... *B04C 3/04* (2013.01); *B04C 3/06* (2013.01); *F02M 35/0223* (2013.01)

(58) Field of Classification Search
CPC ... A47L 9/1641; A47L 9/1683; A47L 9/1625; A47L 9/1608; B01D 45/16
USPC .......... 55/394, 396, 346, 347, 348, 457, 423, 55/466
See application file for complete search history.

(56) References Cited

U.S. PATENT DOCUMENTS

| | | | |
|---|---|---|---|
| 2,762,450 A | 9/1956 | Westlin | |
| 2003/0217534 A1 * | 11/2003 | Krisko et al. | .................. 55/337 |
| 2010/0313533 A1 | 12/2010 | Muenkel | |
| 2013/0031878 A1 | 2/2013 | Menssen | |

FOREIGN PATENT DOCUMENTS

| | | |
|---|---|---|
| DE | 102008011186 A1 | 9/2009 |
| DE | 102010014278 A1 | 10/2011 |
| EP | 2052659 A2 | 4/2009 |

* cited by examiner

*Primary Examiner* — Dung H Bui
(74) *Attorney, Agent, or Firm* — James Hasselbeck

(57) ABSTRACT

A cyclone separator has individual cyclones each provided with a cell tube with a guide device that causes a gas stream passing through the cell tube to rotate. A particle discharge is positioned perpendicularly to a longitudinal axis of the cyclone separator and discharges particles separated from the gas stream. The discharge direction of the separated particle is perpendicular to the longitudinal axis of the cyclone separator and is oriented toward the particle discharge. The individual cyclones include at least four individual cyclones that are arranged such that a connecting line, connecting of these four individual cyclones those individual cyclones that are neighboring each other at a minimal spacing, respectively, forms a diamond, wherein the sides of the diamond are positioned at an angle of 30 to 60 degrees relative to discharge direction.

14 Claims, 3 Drawing Sheets

CYCLONE SEPARATOR

CROSS REFERENCE TO RELATED APPLICATIONS

This application claims the benefit under 35 USC 119 of German patent applications DE 10 2012 020 133.8 filed: Oct. 15, 2012 and DE 10 2012 020 380.2 filed: Oct. 18, 2012, the above German patent applications are hereby incorporated by reference in their entirety.

TECHNICAL FIELD

The invention relates to a cyclone separator, in particular a cyclone pre-separator, for separating liquid and/or solid particles from a gas stream.

BACKGROUND OF THE INVENTION

The invention concerns a cyclone separator, in particular a cyclone pre-separator, for separating liquid and/or solid particles from a gas stream. The cyclone separator comprises a plurality of individual cyclones that, for separating the particles from the gas stream, each have a cell tube with a guide device wherein the guide device is designed to cause the gas stream to rotate. The cyclone separator further comprises a particle discharge for discharging the separated particles from the cyclone separator, wherein the particle discharge is arranged perpendicularly to the longitudinal axis of the cyclone separator and wherein the at least one discharge direction of the separated particles is perpendicular to the longitudinal axis of the cyclone separator and extends in the direction toward the particle discharge.

A cyclone separator embodied as a multi-cell cyclone that is serving as a pre-separator for an air filter is disclosed, for example, in the publications DE 10 2010 014 278 A1 and DE 10 2008 011 186 A1. Moreover, an air filter with a pre-separator configured as a multi-cell cyclone is disclosed in the publication WO 2009/106591 A2. In this connection, usually several individual cyclones are arranged on top of each other in the discharge direction of the particles.

The publications EP 2 052 659 A2 and JP 60-172371 A disclose cyclone separators with individual cyclones that are arranged at a slant above each other in the discharge direction.

In all of these known cyclone separators there is the problem that the separated particles deposit on the outer contour of the individual cyclones that are arranged downstream in the dust discharge direction and may accumulate in the cyclone separator, in particular on the outer contour of the individual cyclones, instead of being discharged through the particle discharge. This is a problem in particular in cyclone separators in which the particles are not additionally removed by suction.

Deposits of separated particles in the cyclone separator cause a significant reduction of efficiency and service life of the cyclone separator. For example, the particle deposits on the outer contour of the individual cyclones can grow upward toward the individual cyclones arranged above, viewed in the discharge direction, and the particle outlet openings of the individual cyclones arranged on top, viewed in the discharge direction, can become plugged or the particles can be sucked back into the cyclone cells.

Based on the above-described disadvantages and weaknesses, taking into account the discussed prior art, it is an object of the present invention to further develop a cyclone separator of the aforementioned kind in such a way that the separated particles are removed from the cyclone separator more reliably and deposits are prevented.

SUMMARY OF THE INVENTION

In accordance with the present invention, this is achieved in that at least four of the individual cyclones are arranged such that a connecting line, connecting of these four individual cyclones those individual cyclones that are neighboring each other at a minimal spacing, respectively, forms a diamond, in particular substantially or precisely a square, wherein the sides of this diamond each are positioned at an angle of approximately 45 degrees relative to the discharge direction of the separated particles.

Advantageous embodiments and expedient further variants of the present invention are described in the dependent claims.

Accordingly, the present invention is based on the feature that at least some of the individual cyclones arranged with respect to the discharge direction of the separated particles on top of each other are not positioned in the densest packing in which the individual cyclones are immediately adjoining each other but at a spacing relative to each other. In this way, an accumulation of the separated particles that extends up to the individual cyclone positioned above with respect to the discharge direction and clogging of this individual cyclone are prevented.

The spacing between the individual cyclones arranged on top of each other with respect to the discharge direction of the separated particles is achieved in that at least four of the individual cyclones are arranged such that an imaginary connecting line, connecting of these four individual cyclones those individual cyclones that are neighboring each other at a minimal spacing, respectively, substantially defines a square. The sides of this square each are positioned at an angle of approximately 45 degrees, i.e., between 30 degrees and 60 degrees, preferably between 40 degrees and 50 degrees, particularly preferred precisely 45 degrees, relative to the discharge direction of the separated particles. The discharge direction is in general approximately or precisely vertical.

A substantially square shape in the meaning of the invention is thus square-like but can also be deviating from a square toward in particular an isosceles diamond. The basic shape of these four individual cyclones is thus a square that, in the discharge direction, is standing on its tip or a diamond that is standing on its tip. Advantageously, all individual cyclones are arranged such that they, together with their neighboring individual cyclones, can be correlated to define a square that is standing on its tip when viewed in the discharge direction. This arrangement of a square that is standing on its tip has the advantage that the particle discharge of the cyclone separator can be arranged in the length direction as well as in the transverse direction of the cyclone separator. The individual cyclones that are arranged on top of each other with respect to the discharge direction of the separated particles, in an arrangement of the particle discharge in length direction of the cyclone separator as well as in an arrangement of the particle discharge in the transverse direction of the cyclone separator, are not arranged in the densest packing but at a spacing to each other.

In one embodiment, in the lower area of the cyclone separator, i.e., near the particle discharge, the vertical spacings between the individual cyclones are greater than in the upper area. In the lower area, the quantity of the dust that is passing between the individual cyclones is higher than in the upper area. With this arrangement, an improved transport of the particles in the direction toward the particle discharge can therefore be achieved. For example, the individual cyclones in the upper area can be exactly arranged in a square arrangement and in the lower area in the form of diamonds. In this context, the first diagonal of the diamonds in the horizontal direction has at least substantially the same length as the diagonal of the squares in the upper area; however, the second diagonal of the diamonds in the vertical direction is longer than the first diagonal of the diamonds.

According to a particularly advantageous embodiment of the present invention, at least some of the neighboring individual cyclones are arranged in rows or lines wherein these rows or lines each are oriented at an angle of approximately 45 degrees relative to the discharge direction of the particles. In particular, all individual cyclones that are neighboring each other at the minimal spacing can be correlated with a common row or line. In this particularly advantageous embodiment, the rows or lines of the neighboring individual cyclones are thus rotated approximately by 45 degrees relative to the discharge direction.

For a targeted discharge of the separated particles to the particle discharge, the cell tubes each have according to an advantageous embodiment of the present invention a particle outlet opening that is facing the particle discharge. As a result of the square arrangement of the individual cyclones in accordance with the invention, the spacings between the dust outlet openings and the individual cyclones arranged underneath in the discharge direction are particularly large in comparison to the prior art. A particular advantage of the present invention in this embodiment is thus the enlargement of the individual cyclones spacings in relation to the particle outlet opening.

Independent thereof or in combination therewith, according to a further special advantageous embodiment of the present invention, at least one individual cyclone, in particular at least some of the individual cyclones, for example, the individual cyclones that are arranged in the area of the lower third or lower quarter of the cyclone separator when viewed in the discharge direction of the particles, or the individual cyclones arranged at a minimal distance relative to the particle discharge have at least one particle guiding element. This particle guiding element is designed such that, in the discharge direction, particles that have been separated above the particle guiding element are guided away across the particle guiding element, in particular across the outer contour of the individual cyclone that is correlated with the particle guiding element, and guided in the direction toward the particle discharge.

The particle guiding element is preferably arranged in an area of the outer contour of the individual cyclone that is facing away from the particle discharge. For example, the particle guiding element can be arranged at least in an area of the outer contour of the individual cyclone that is located underneath a particle outlet opening, when viewed in the discharge direction.

Advantageously, the particle guiding element can have a roof shape, for example, the shape of a pitched roof, and can be positioned on the side of the outer contour of the individual cyclone that is facing away from the particle discharge. The particle guiding element is thus preferably designed to guide the separated particles like a roof or a ramp across the individual cyclone that has the particle guiding element arranged on its outer contour.

The surface of the particle guiding element that comes into contact with the separated particles is preferably particularly smooth so that the particles can slide well across this surface. A special smooth surface is achieved, for example, when the particle guiding element is produced by an injection molding process. In this connection, the particle guiding elements can be realized, for example, by means of at least one exchangeable insert in a simple way.

According to a preferred embodiment of the present invention, the gas stream flows in the direction of the longitudinal axis of the individual cyclones or in the direction of the longitudinal axis of the cyclone separator. The cell tubes can be associated with a first cyclone component. Moreover, in this embodiment in the flow direction of the gas stream a plurality of immersion tubes are arranged wherein the immersion tubes have at their downstream end in the flow direction of the gas stream a central outlet for discharging the purified gas stream. These immersion tubes can be correlated with a second cyclone component. Moreover, the immersion tubes are designed to be received in the cell tubes and to be connected, at least partially, with their end downstream in the flow direction of the gas stream to the end of the respective cell tubes downstream in the flow direction of the gas stream.

The present invention has the advantage that the cyclone separator in comparison to the prior art has a reduced performance loss tendency and the operative safety of the cyclone separator is increased in comparison to the prior art.

The present invention concerns moreover the use of a cyclone separator according to the present invention as a pre-separator for an air filter system of an internal combustion engine, in particular for a construction machine, for example, for a skid loader or for a backhoe loader or for a forklift, or for an agricultural machine, for example, a tractor, or for a mobile or stationary compressor, or for a vehicle or a machine in gardening or landscaping, or for a stationary machine for energy generation.

BRIEF DESCRIPTION OF THE DRAWINGS

As already discussed above, there are various possibilities for implementing and developing the teachings of the present invention in advantageous ways. Reference is being had in this context to the dependent claims. Also, in the following, embodiments and variants of the invention and features and advantages of the invention will be explained in more detail, inter alia with the exemplary embodiment illustrated in the drawings.

Figure 1:
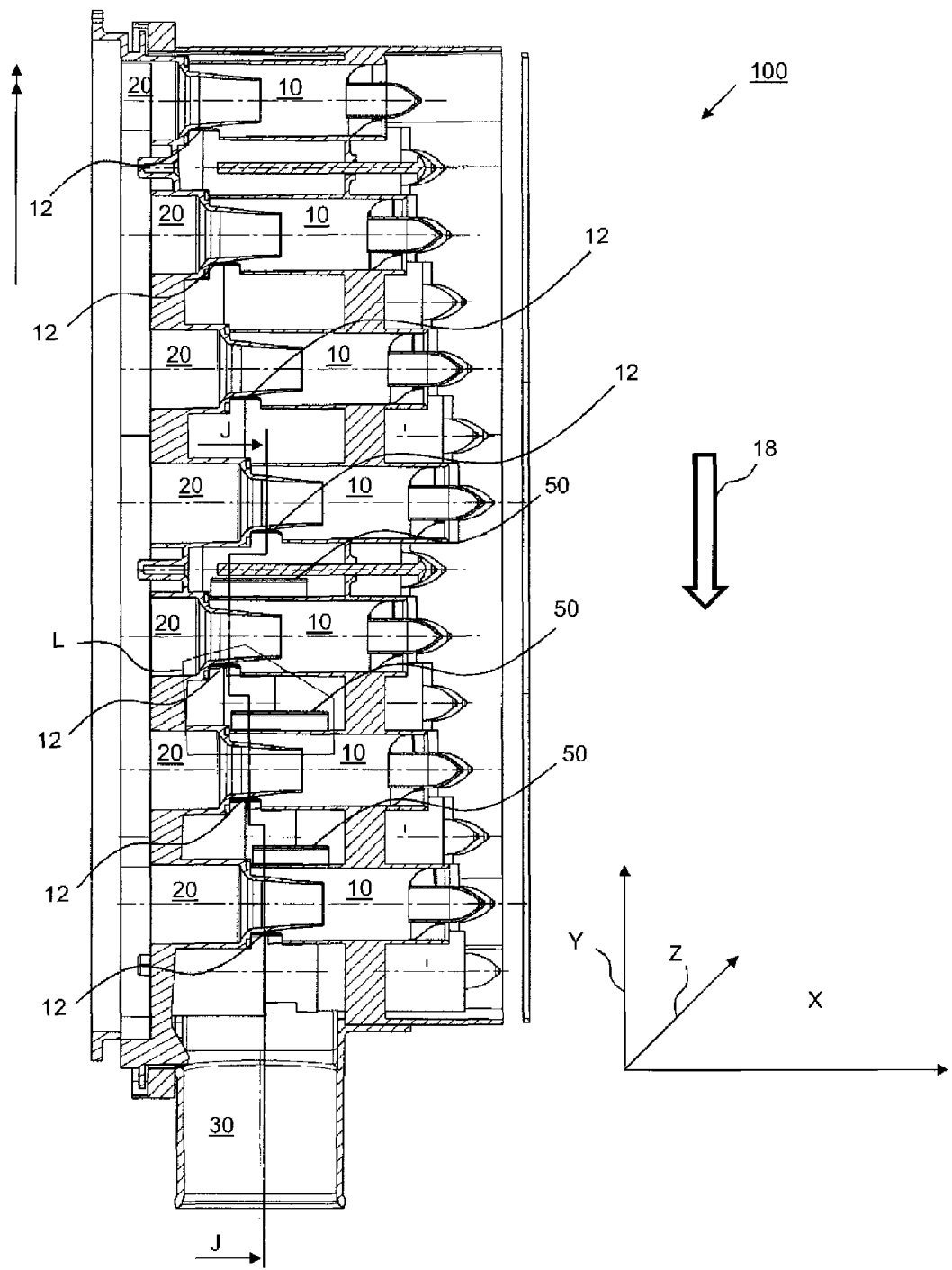
FIG. 1 shows in section illustration a side view of an embodiment of the cyclone separator according to the present invention.

Same or similar configurations, elements or features are identified in FIGS. 1 through 4 with identical reference characters. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In the embodiment of a cyclone separator 100 according to the present invention illustrated in FIGS. 1 through 4, it can be seen in the cross-section of the cyclone separator 100 (compare FIG. 2) that the individual cyclones are arranged such that the connecting line, connecting in a set of four individual cyclones, respectively, those individual cyclones that are neighboring each other at a minimal spacing, defines a square. The sides 40, 42, 44, 46 of this square each are positioned at an angle of approximately 45 degrees relative to the discharge direction 18, 19 of the separated particles. In the cross-sectional illustration of the cyclone separator 100 the basic pattern of the individual cyclones is thus a square that is positioned on its tip.

One feature of the embodiment illustrated in FIGS. 1 through 4 according to the present invention is thus the arrangement of the individual cyclones according to a basic square pattern, viewed in cross-section of the cyclone separator 100, wherein the sides 40, 42, 44, 46 of the squares are each positioned at an angle of approximately 45 degrees to the discharge direction 18 in length direction of the cyclone separator 100 as well as relative to the discharge direction 19 in transverse direction of the cyclone separator 100. Accordingly, the individual cyclones are not arranged in the densest packing but are positioned at a spacing relative to each other relative to the discharge direction 18 in the length direction of the cyclone separator 100, i.e., relative to the particle discharge 30 (compare FIGS. 1 and 2), as well as relative to the discharge direction in the transverse direction of the cyclone separator 100, i.e., relative to the particle discharge 32 (compare FIG. 2). With this arrangement in the manner of a square that is placed on its tip in relation to the discharge directions 18, 19, an improved particle discharge is achieved in comparison to the prior art because the individual cyclone cells will clog significantly later as compared to the configurations that are known in the prior art.

A further feature of the cyclone separator 100 of FIGS. 1 through 4 that according to the present invention provides a better particle discharge in comparison to the prior art resides in the particle guiding elements, for example, dust defectors 50, provided in the lower area of the cyclone separator 100 near the area of the particle discharge 30. The dust deflectors 50 are arranged on the outer contour of the individual cyclones.

These dust deflectors 50 have at least two lateral surfaces 52, 54 for guiding the separated particles. The lateral surfaces 52, 54 are angularly positioned relative to each other and these lateral surfaces 52, 50 each are slanted toward the particle discharge 30. In order for the particles to slide well across the lateral surfaces 52 and 54, these lateral surfaces 52, 54 are preferably arranged at an angle of less than or equal to approximately 50 degrees relative to the discharge direction 18 in the length direction of the cyclone separator and/or to the discharge direction 19 in transverse direction of the cyclone separator.

For example, the lateral surfaces 52, 54 of the particle guiding element 50 can be arranged at an angle of approximately 90 degrees relative to each other; relative to the discharge direction 18 in the length direction of the cyclone separator as well relative to the discharge direction 19 in transverse direction of the cyclone separator they are thus positioned at an angle of approximately 45 degrees, respectively.

Figure 2:
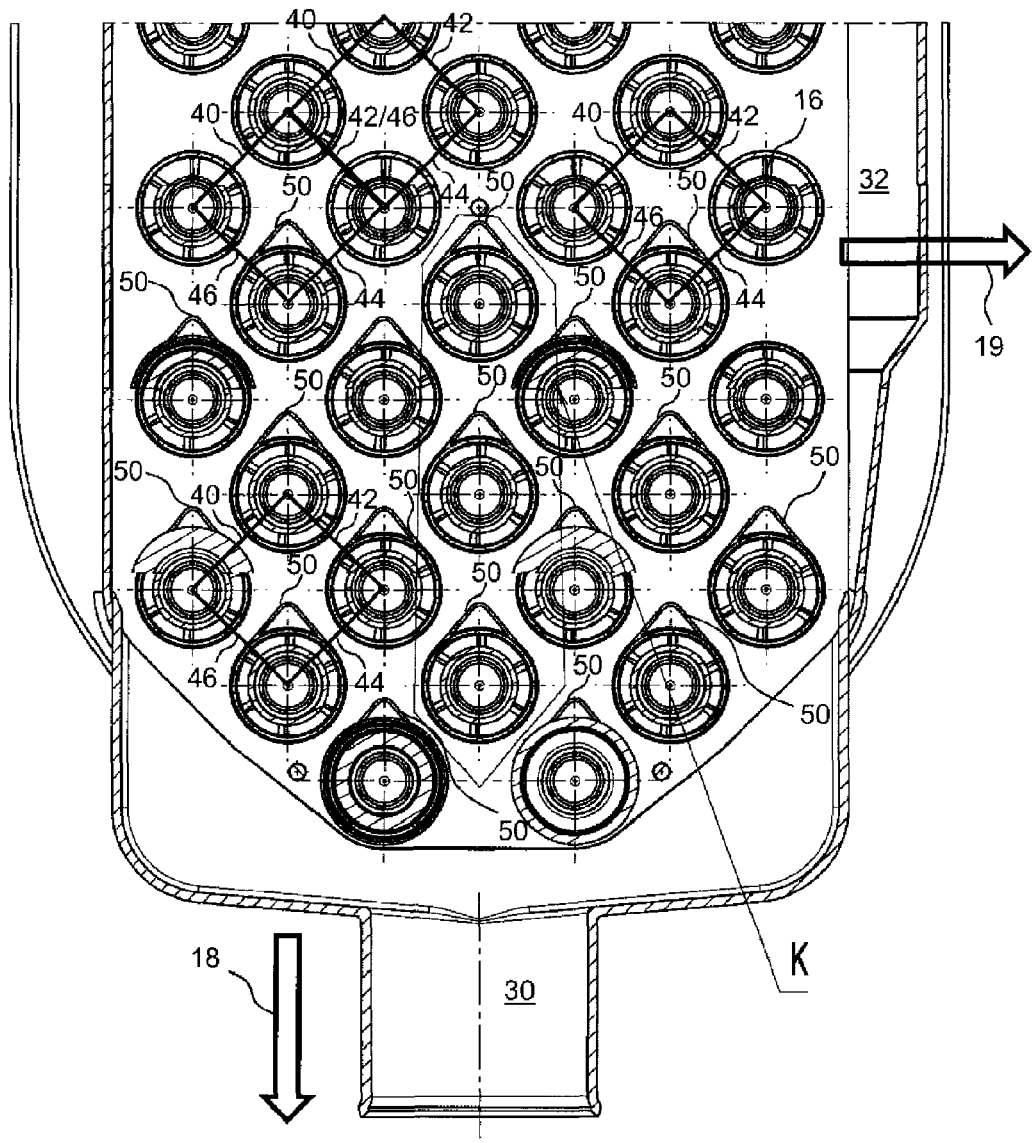
FIG. 2 shows the cyclone separator of FIG. 1 in a section view along the section line J-J of FIG. 1.
Figures 3, 4:
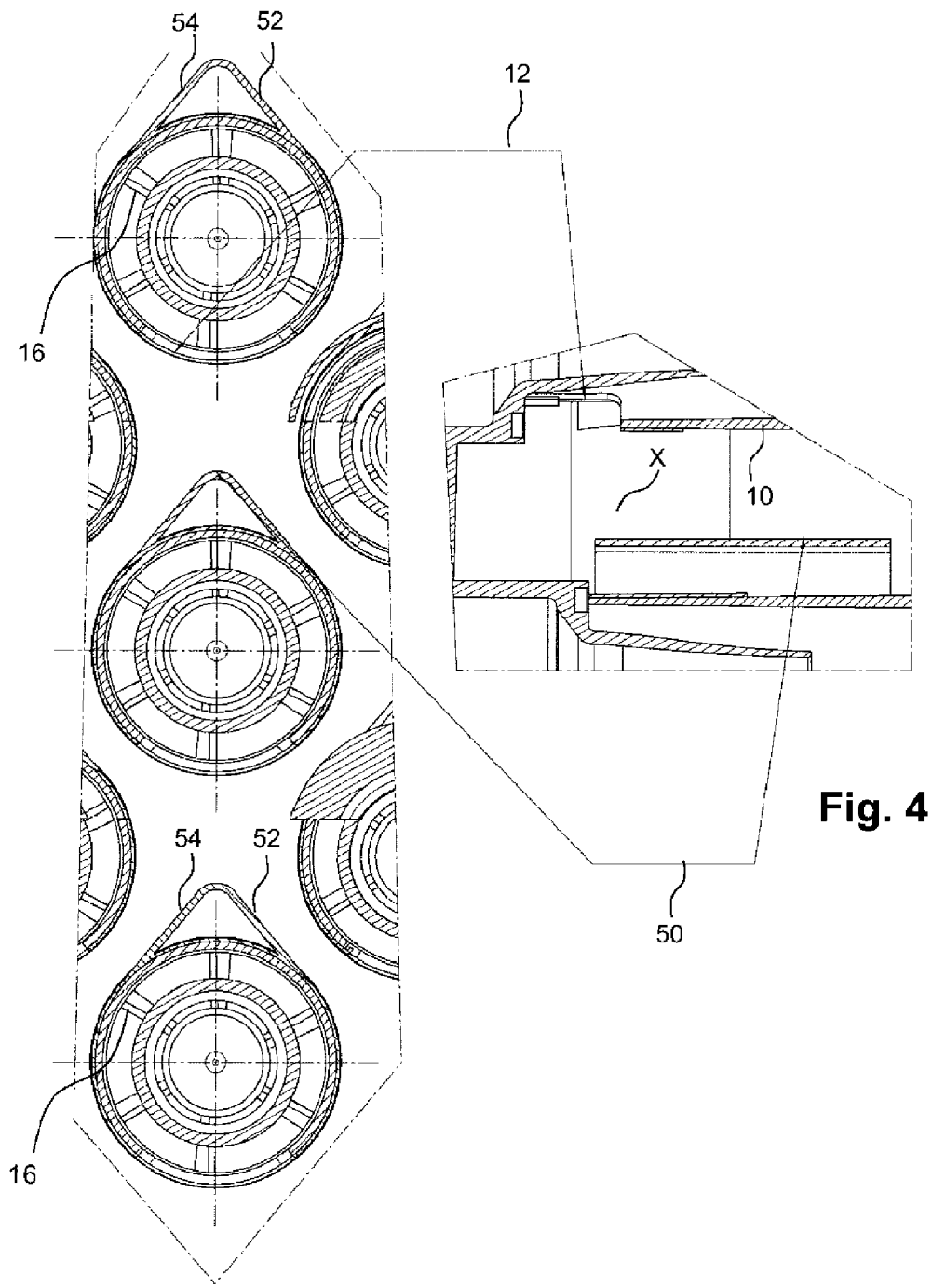
FIG. 3 is a detail view of the area K (see FIG. 2) of the cyclone separator of FIG. 1.
FIG. 4 is a detail view of the area L (see FIG. 1) of the cyclone separator of FIG. 1.

As can be seen in FIGS. 2 and 3, the dust deflectors 50 are preferably arranged such on the outer contour of the respective individual cyclones that, viewed in cross-section of the cyclone separator 100, the respective particle guiding element 50 and the area of the outer contour of the respective individual cyclone that is facing the particle guiding element 50 define a shape of the letter A. The dust deflectors 50 can be realized thus in the shape of the letter A. In this arrangement, the separated particles are guided particularly well across the ramp-shaped or hood-shaped dust deflectors 50 arranged on the individual cyclones because the ramp angle is steep enough for the particles to slide downwardly across the dust deflectors 50.

In FIGS. 3 and 4 the position of a dust deflector 50 relative to a particle outlet opening is illustrated, i.e., a dust discharge port 12.

The present invention has the advantage that the cyclone separator has a minimal performance loss tendency in comparison to a cyclone separator according to the prior art.

The dust deflectors 50 can be realized for example simply by exchangeable inserts in the tool.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A cyclone separator for separating liquid and/or solid particles from a gas stream, the cyclone separator comprising:
   individual cyclones each comprising
      a cell tube with a guide device
         wherein the guide device is designed such that a gas stream passing through the cell tube is caused to rotate;
   at least one particle discharge positioned perpendicularly to a longitudinal axis of the cyclone separator and adapted to discharge separated particles that have been separated from the gas stream in the individual cyclones from the cyclone separator,
   wherein at least one discharge direction of the separated particle is perpendicular to the longitudinal axis of the cyclone separator and is oriented in a direction toward the at least one particle discharge;
   wherein the individual cyclones include at least four individual cyclones that are arranged such that a connecting line, connecting of said four individual cyclones those individual cyclones that are neighboring each other at a minimal spacing, respectively, forms a diamond, wherein sides of the diamond each are positioned at an angle of 30 degrees to 60 degrees relative to the at least one discharge direction;
   wherein the individual cyclones include at least one individual cyclone provided with a particle guiding element;
   wherein the particle guiding element is adapted to guide the separated particles that have been separated above the particle guiding element in the at least one discharge direction across the particle guiding element in a direction toward the cyclone separator particle discharge;
   wherein the individual cyclones have an outer contour;
   wherein the particle guiding element is arranged on the outer contour of its respective individual cyclone, the particle guiding element extending over a portion of the outer contour area that is facing away from the cyclone separator particle discharge;
   wherein the particle guiding element comprises a first lateral surface and a second lateral surface, the lateral surfaces positioned at an angle relative to each other;

the first lateral surface connected at a lower edge onto the outer contour of its respective individual cyclone;

the second lateral surface connected at a lower edge onto the outer contour of its respective individual cyclone;

wherein the lateral surfaces are joined together at their upper lateral edges;

wherein the particle guiding element at the joined lateral edges is spaced radially outwardly away from the outer contour of its respective individual cyclone.

2. The cyclone separator according to claim 1, wherein the diamond is a square.

3. The cyclone separator according to claim 1, wherein the angle is between 40 degrees and 50 degrees.

4. The cyclone separator according to claim 3, wherein the angle is 45 degrees.

5. The cyclone separator according to claim 1, wherein the particle guiding element and the outer contour area of said at least one individual cyclone, viewed in cross-section of the cyclone separator, define a letter A.

6. The cyclone separator according to claim 1, wherein the cell tubes each have at least one particle outlet opening that is facing the particle discharge and that is adapted to provide a targeted discharge of the separated particles toward the particle discharge, wherein the particle guiding element is arranged in the discharge direction underneath the at least one particle outlet opening.

7. The cyclone separator according to claim 1, wherein the lateral surfaces are slanted toward the cyclone separator particle discharge such that the separated particles slide across the lateral surfaces in a direction toward the particle discharge.

8. The cyclone separator according to claim 7, wherein the lateral surfaces are positioned at an angle of less than or equal to approximately 50 degrees to the discharge direction.

9. The cyclone separator according to claim 7, wherein the lateral surface are positioned relative to each other at an angle of approximately 90 degrees and at an angle of approximately 45 degrees relative to the discharge direction.

10. The cyclone separator according to claim 1, wherein the particle guiding element is produced by injection molding.

11. The cyclone separator according to claim 1, wherein at least the individual cyclones that are arranged at a minimal spacing relative to the particle discharge are provided with the particle guiding element, respectively.

12. The cyclone separator according to claim 11, wherein at least the individual cyclones that are arranged in the lower third of the cyclone separator in the discharge direction are provided with the particle guiding element, respectively.

13. The cyclone separator according to claim 11, wherein at least the individual cyclones that are arranged in the lower quarter of the cyclone separator in the discharge direction are provided with the particle guiding element, respectively.

14. The cyclone separator according to claim 1 as a pre-separator for an air filter system of an internal combustion engine of a construction machine, of an agricultural machine, of a mobile or stationary compressor, of a vehicle or a machine in gardening or landscaping, or of a stationary machine for energy generation.

* * * * *